(12) United States Patent
Sullivan

(10) Patent No.: US 8,039,099 B1
(45) Date of Patent: Oct. 18, 2011

(54) NANOENCAPSULATED AEROGELS PRODUCED BY MONOMER VAPOR DEPOSITION AND POLYMERIZATION

(75) Inventor: Thomas A. Sullivan, Houston, TX (US)

(73) Assignee: The United States of America as represented by the Administrator of the National Aeronautics and Space Administration, Washington, DC (US)

( * ) Notice: Subject to any disclaimer, the term of this patent is extended or adjusted under 35 U.S.C. 154(b) by 348 days.

(21) Appl. No.: 11/848,332

(22) Filed: Aug. 31, 2007

Related U.S. Application Data

(62) Division of application No. 10/985,081, filed on Nov. 4, 2004, now Pat. No. 7,270,851.

(51) Int. Cl.
*B32B 3/26* (2006.01)

(52) U.S. Cl. ............... 428/319.1; 428/306.6; 428/319.3; 428/319.7

(58) Field of Classification Search ............... 428/319.3, 428/319.7, 319.9, 306.6, 319.1
See application file for complete search history.

(56) References Cited

U.S. PATENT DOCUMENTS

| | | | |
|---|---|---|---|
| 3,960,826 A | 6/1976 | Aboutboul et al. | |
| 4,717,594 A | 1/1988 | Graham et al. | |
| 4,898,898 A | 2/1990 | Fitzgerald et al. | |
| 5,443,746 A * | 8/1995 | Harris et al. | 252/62.9 R |
| 5,549,753 A | 8/1996 | Matthews et al. | |
| 5,698,140 A * | 12/1997 | Lamb et al. | 252/502 |
| 5,744,510 A | 4/1998 | Pekala | |
| 5,855,953 A | 1/1999 | Cao et al. | |
| 5,879,744 A | 3/1999 | Cao et al. | |
| 5,949,071 A * | 9/1999 | Ruffner et al. | 250/338.3 |
| 6,068,882 A | 5/2000 | Ryu | |
| 6,114,156 A | 9/2000 | McDaniel et al. | |
| 6,426,116 B1 | 7/2002 | Sunol | |
| 6,492,014 B1 | 12/2002 | Rolison et al. | |
| 6,528,153 B1 * | 3/2003 | Benzing et al. | 428/307.3 |
| 6,598,358 B1 | 7/2003 | Schwertfeger et al. | |
| 6,598,459 B1 * | 7/2003 | Fu | 73/23.34 |
| 6,649,713 B2 | 11/2003 | Tang et al. | |
| 6,713,177 B2 | 3/2004 | George et al. | |
| 6,723,388 B2 | 4/2004 | Svendsen et al. | |
| 2004/0132846 A1 | 7/2004 | Leventis et al. | |
| 2005/0153130 A1 * | 7/2005 | Long et al. | 428/357 |

OTHER PUBLICATIONS

The article "More about RF sputtering", 2010, Phasis; Switzerland, 1 page.*
Larry L. Hench and Jon K. West, The Sol-Gel Process, Chemical Reviews, 1990, vol. 90 #1, pp. 33-72.
J. K. Floess, R. Field, S. Rouanet, The use of vinyl functional aerogels for reinforcement of silicone rubbers, Journal of Non-Crystalline Solids 285, 2001, pp. 101-108.
H. D. Gesser and P. C. Goswami, Aerogels and Related Porous Materials, Chemical Reviews, 1989, vol. 89 #4, pp. 765-788.
Ulrich Schubert, Nicola Husing, and Anne Lorenz, Hybrid Inorganic-Organic Materials by Sol-Gel Processing of Organofunctional Metals Alkoxides, Chem. Mater., 1995, vol. 7, #11, pp. 2010-2027.
Jianye Wen and Garth L. Wilkes, Organic/Inorganic Hybrid Network Materials by the Sol-Gel Approach, Chem. Mater. 1996, vol. 8, #8, pp. 1667-1681.

* cited by examiner

*Primary Examiner* — Hai Vo
(74) *Attorney, Agent, or Firm* — Theodore U. Ro

(57) ABSTRACT

Polymer coated aerogel comprising aerogel substrate comprising a substantially uniform polymer coating. In an embodiment, the polymer coated aerogel is comprised of a porosity and has a compressive modulus greater than the compressive modulus of the aerogel substrate.

8 Claims, No Drawings

NANOENCAPSULATED AEROGELS PRODUCED BY MONOMER VAPOR DEPOSITION AND POLYMERIZATION

CLAIM OF BENEFIT OF PRIORITY OF PRIOR-FILED CO-PENDING NON-PROVISIONAL APPLICATION

This application is a divisional of commonly-owned U.S. patent application Ser. No. 10/985,081, filed Nov. 4, 2004, now U.S. Pat. No. 7,270,851.

ORIGIN OF THE INVENTION

The invention described herein was made by an employee of the United States Government and may be manufactured and used by or for the Government of the United States of America for governmental purposes without the payment of any royalties thereon or therefor.

FIELD OF THE APPLICATION

The application relates to a composition of matter for nanoencapsulated aerogels.

BACKGROUND OF THE APPLICATION

Aerogels are nanoporous, lightweight materials with very low thermal and acoustic conductivity and high porosity. Not surprisingly, aerogels tend to lack mechanical strength. Various attempts have been made to increase the mechanical strength of aerogels; however, such methods tend to adversely affect desired aerogel properties.

BRIEF SUMMARY

The application provides a nanoencapsulated aerogel of increased compressive modulus and associated methods of making said aerogel. The method comprises: providing aerogel substrate comprising a bubble matrix in a chamber; providing monomer to the chamber comprising vapor phase monomer which polymerizes substantially free of polymerization byproducts; depositing monomer from the vapor phase onto the surface of the aerogel substrate under deposition conditions effective to produce a vapor pressure sufficient to cause the vapor phase monomer to penetrate into the bubble matrix and deposit onto the surface of the aerogel substrate, producing a substantially uniform monomer film; and, polymerizing the substantially uniform monomer film under polymerization conditions effective to produce polymer coated aerogel comprising a substantially uniform polymer coating substantially free of polymerization byproducts.

The application also provides a polymer coated aerogel comprising an aerogel substrate that is comprised of a substantially uniform polymer coating, wherein the polymer coated aerogel is comprised of a porosity and having a compressive modulus greater than the compressive modulus of the aerogel substrate, as measured by a 100 lb. load cell at 1 mm/minute in the linear range of 20% to 40% compression.

DETAILED DESCRIPTION

Aerogels generally are produced by drying a suitable gel. The term "gel" refers to a coherent, rigid, continuous three-dimensional network of colloidal particles and the residual solution in which the network was formed. Gels are produced by the aggregation of colloidal particles, typically under acidic conditions, to form a three dimensional gel microstructure. Aerogel forms when the gel is dried, or liquid is removed from the pores of the gel in a manner which leaves the gel microstructure preserved.

Aerogels generally are inorganic, organic, or combinations thereof. Organic aerogels are derived from widely diverse starting materials, e.g. melamine formaldehyde. Inorganic aerogels generally comprise a colloidal component. Suitable colloidal components comprise an element including, but not necessarily limited to elements selected from the group consisting of silicon, aluminum, titanium, zirconium, tin, cerium, vanadium, hafnium, and mixtures thereof. Methods for producing inorganic aerogels are described in H. D. Gesser, P. C. Goswarni, Chem. Rev. 1989, 89, 765 et seq., incorporated herein by reference. The preferred colloidal component will differ depending upon the application. For most purposes, a preferred colloidal component is silicon dioxide or silica.

Aerogels typically possess a nanostructure that is composed of extremely small interconnected particles with diameters of from 2 to about 10 nanometers and which surround pore spaces that are typically less than 100 nm and have an average or mean pore diameter of about 20 nm to about 100 nm. The interconnected particles produce a solid material comprising pores, sometimes called a "bubble matrix," with ultrafine pore size, low density, high surface area (350-1500 $m^2/g$), and open-cell porosity. The nanostructure of aerogels give them unusual acoustic, optical, thermal, and mechanical properties. As a result of their particle size, aerogels do not appreciably scatter visible light and can be made transparent. The high porosity and small pore size of aerogels also makes aerogels lightweight, super-insulating materials.

Common physical properties of silica aerogels are listed in Table 1 below:

TABLE 1

| PROPERTY | VALUE |
| --- | --- |
| Density | 0.003-0.35 $g/cm^3$ |
| Internal Surface Area | 350-1500 $m^2/g$ |
| Mean Pore Diameter | 20-100 nm |
| Primary Particle Diameter | 2-10 nm |

Internal surface area is calculated based on the amount of nitrogen adsorbed at five different relative pressures over the range 0.05 to 0.25 according to the Brunauer-Emmett-Teller (BET) model, which is referenced in Gregg, S. J. and Sing, K. S. W, "Adsorption, Surface Area and Porosity," p. 285, Academic Press, New York (1991), incorporated herein by reference.

The foregoing properties may be significantly affected by the conditions used to prepare the aerogels and any subsequent post-processing.

In a preferred embodiment, the bubble matrix may be empty (vacuum), or may contain one or more gas(es). In a preferred embodiment, the bubble matrix contains air; however, the bubble matrix may contain substantially any environmentally compatible gas, including but not necessarily limited to gases comprising oxygen, helium, nitrogen, carbon dioxide, and other inert elements, or other low activity gases.

Method for Strengthening Aerogels

As explained above, aerogels tend to be relatively fragile. The application provides a method for increasing the mechanical strength of aerogels. A substantially uniform monomer film is deposited on the aerogel substrate and polymerized.

As a consequence of strengthening the aerogel, the polymer coating improves the integrity of the treated material.

Untreated aerogel is subject to the formation of small fragments that break off the main body of the material during handling, flexing, compression, etc. When the aerogel substrate is encapsulated in an adequate layer of polymer, however, the material is less subject to such particulate formation. This is especially true when the polymer is bound to the aerogel substrate by the incorporation of a compatibilizing group on the surface of the aerogel (discussed more fully below).

—Suitable Monomers

Substantially any vaporizable or sublimable polymerizable monomers may be used in the process as long as the monomers vaporize and deposit onto the aerogel within a commercially reasonable period of time at a pressure of 1 atmosphere or below at temperatures sufficiently low to avoid damaging the monomer or the aerogel substrate. A commercially reasonable period of time will vary depending upon the value of the polymer coated aerogel. For most monomers and aerogel substrates, a commercially reasonable period of time is 24 hours or less. At temperatures of about 200° C. or less, preferably about 150° C. or less, at pressures of 1 atm or lower, preferred monomers generate sufficient vapor pressure to cause the vapor phase monomer to penetrate into the bubble matrix and deposit onto the surface of the aerogel substrate, producing a "substantially uniform monomer film" (defined below). Preferred monomers also tend to have an inherent attraction to the surface of the aerogel substrate under vapor-phase conditions. The type of inherent attraction may vary depending on the aerogel substrate and its surface properties. In a preferred embodiment, the monomers tend to form hydrogen bonds with the surface of the aerogel substrate and/or to react with hydroxyl groups at the surface of the aerogel substrate.

Suitable monomers produce polymer coating having desired properties, including but not necessarily limited to strength, flexibility, non-flammability, elasticity, thermal stability, electrical conductivity, and transparency. Suitable properties also may involve, but are not necessarily limited to stability to ultraviolet light, ability to absorb infrared or ultraviolet light, and/or stability to radiation. Suitable polymer coatings include, but are not necessarily limited to polyamides, polyesters, polysiloxanes, polyacetals, polyaramides, polyolefins, polypyrroles, parylene polymers, thermosetting resins, and polyacrylates. Suitable polyacrylates include, but are not necessarily limited to polyacrylates, polymethacrylates, and polycyanoacrylates. Preferred thermosetting resins are produced from the reaction of a phenolic compound and formaldehyde. Preferred polymer coatings include, but are not necessarily limited to polyamides and polyolefins. Preferred polyamides include, but are not necessarily limited to nylon, preferably nylon-6. Preferred polyolefins include but are not necessarily limited to polyacrylates.

Suitable monomers deposit, preferably by adsorption, onto the surface of individual filaments of the aerogel substrate under vapor phase conditions. The propensity of monomers to deposit onto the surface of the aerogel substrate depends on the polarity of the monomers and the nature of the surface of the aerogel substrate (i.e., the number of hydrogen-bonding sites). Where the surface of the aerogel substrate has a high oxygen content, as with silica aerogels, monomers with more polar groups tend to adsorb onto the surface of the monomer more readily.

Suitable monomers polymerize by a reaction which produces polymer substantially free of byproducts. Suitable monomers polymerize by any reaction type, including but not necessarily by addition and condensation reactions. Preferred monomers are selected from the group consisting of monomers which polymerize by addition reactions, difunctional cyclic monomers comprising complimentary polymerizable groups, a combination of phenolic monomer and formaldehyde, and 4-amino methylbenzoate.

Addition reactions include, but are not necessarily limited to free radical addition reactions, anionic addition reactions, and cationic addition reactions. Examples of monomers that undergo addition reactions include, but are not necessarily limited to monomers comprising polymerizable unsaturated carbon-carbon bonds.

Examples, of polymers produced by condensation reactions include, but are not necessarily limited to polyamides and polyesters. Monomers which polymerize via condensation reactions generally produce by-products, such as water, alcohol, HCl, combinations thereof, depending on the particular starting materials. The production of byproducts can be avoided in condensation reactions, and in other types of reactions, using difunctional cyclic monomers comprising complimentary polymerizable groups. In a preferred embodiment, the complimentary polymerizable groups comprise an element selected from the group consisting of oxygen and nitrogen. Examples of preferred difunctional cyclic monomers comprising complimentary polymerizable groups include, but are not necessarily limited to caprolactam (which produces nylon-6), caprolactone (which produces polyester), and hexamethylcyclotrisiloxane (which produces poly-dimethylsiloxane).

A most preferred difunctional cyclic monomer is caprolactam. Both stoichiometry and by-product concerns are eliminated using caprolactam. Caprolactam is believed to have a strong affinity for the aerogel surface due to hydrogen bonding and reactivity with silanol groups on the aerogel can provide a covalent link to the silica network. The nylon-6 polymer coating produced using caprolactam also has many opportunities to hydrogen-bond with the aerogel substrate.

Another suitable monomer is 4-amino methyl benzoate, which polymerizes to provide a polyaramid (poly-p-benzamide) that can be expected to have high strength and low flammability. This embodiment suffers from the disadvantage, however, that by-product methanol requires removal from the system.

Substantially any complimentary polymerizable groups may be used. Suitable polymerizable groups include, but are not necessarily limited to those selected from the group consisting of acyl groups, amine groups, thiol groups, hydroxyl groups, cyanate groups, groups comprising polymerizable unsaturated carbon-carbon bonds, oxirane groups, amide groups, ester groups, cyclic siloxanes, pyrroles, organosilanes, paracyclophanes, and combinations thereof.

Examples of the foregoing monomers include, but are not necessarily limited to olefins, vinyl carboxylates, vinyl ethers, epoxides, acrylates, methacrylates, cyanoacrylates, formaldehyde, lactams, lactones, hexaorganocyclotrisiloxanes, dichlorodiorganosilanes, [2.2]paracyclophane, and phenols. Examples of suitable olefins include, but are not necessarily limited to ethylene, propylene, butene, and dienes, including but not necessarily limited to isoprene and 1,3-butadiene, optionally with butene or isobutene.

—Formation of Monomer Film

In order to deposit the monomer, the aerogel substrate is placed in a chamber, preferably a sealed chamber. The sealed chamber may or may not be evacuated. Air may be present in the chamber, or it may be replaced with an inert gas to reduce flammability potential, to prevent premature polymerization, and/or to increase the rate of diffusion of the monomer into the aerogel network.

Monomer is provided to the chamber either before or after the substrate is placed in the chamber. The monomer may be a solid, a liquid, or a gas, depending on the properties of the monomer, taking into consideration any process and safety concerns.

In a preferred embodiment, monomer precursor material is placed in the chamber with the aerogel substrate and the chamber is sealed. Monomer vapor typically evolves upon the introduction of energy into the system. In a preferred embodiment, the temperature is controlled and the energy comprises an increase in temperature. The pressure and/or temperature is adjusted causing a vapor pressure sufficient to cause the monomer to penetrate into the bubble matrix and deposit onto the surface of the aerogel substrate to produce a substantially uniform monomer film. Although not required, a vacuum, or reduced pressure, is helpful to remove pore-filling gasses and to increase the rate of permeation and deposition of the monomer into the network of the aerogel substrate. The monomer vapor also may be generated outside of the chamber and introduced into the chamber as a vapor. The deposition temperature and pressure will vary depending upon the monomer.

Deposition is continued until a "substantially uniform" monomer film is formed on the surface of the aerogel substrate. As used herein, the phrase "substantially uniform" means a monomer film which produces a polymer coating upon polymerization which maintains effective porosity while increasing the compressive modulus of the aerogel, as measured by a 100 lb. load cell at 1 mm/minute in the linear range of 20% to 40% compression. Preferably, the monomer thickness is effective to produce a polymer coated aerogel having a compressive modulus which is about 20% or more greater, more preferably about 25% or more greater, even more preferably by about 40% or more greater than the compressive modulus of the aerogel substrate. Generally, the monomer film comprises a quantity of monomer effective to increase the weight of the resulting polymer coated aerogel by about 4 wt. % or more compared to the aerogel substrate, preferably by about 10 wt. % or more, more preferably by about 50 wt. % or more.

A "substantially uniform" monomer film or polymer coating does not mean 100% of the internal surface area of the aerogel substrate is coated with the monomer film, or that the thickness of the monomer film (or the resulting polymer coating) necessarily is the same over the 100% of the internal surface area of the aerogel substrate. In fact, due to the physics of liquid films adhering to solids, a "substantially uniform" monomer film and polymer coating may have different thicknesses at different locations within the aerogel network. Points of contact between the particles which make up the network, known as "necks," are likely to have a thicker monomer film and thus a thicker polymer coating. The thicker polymer coating at the necks tends to strengthen the necks, which otherwise tend to be relatively weak in terms of modulus.

The strength and insulating power of the polymer coated aerogel is varied to meet the needs of a particular product by varying the density and porosity of the starting aerogel substrate and/or by varying the type of monomer used to form the polymer coating, the loading of monomer, and thus the "effective porosity" of the resulting polymer coated aerogel.

Where the polymer coated aerogel is for use as thermal insulation in a rigid item, such as a refrigerator, "effective porosity" is a porosity effective to retard heat transfer. Denser aerogels have a slightly higher thermal conductivity than less dense aerogels. Polymer coated aerogels are denser, and therefore have a slightly higher thermal conductivity than aerogel substrate, but are still effective insulators. The density of a polymer coated aerogel depends upon the density of the aerogel substrate and the amount and type of polymer coating on the aerogel substrate. The slightly higher thermal conductivity of polymer coated aerogel can be decreased by coating the aerogel substrate with an insulating coating effective to suppress infra-red heat transfer. Suitable insulating coatings comprise elements including, but are not necessarily limited to carbon, titania, and combinations thereof.

The common measure of insulating value is calculated as R, which is the resistance to heat flow. Typical residential fiberglass batting in the 3.5 inch gap of a wall has an R value of from about 10 to about 13, or from about 3 to about 4 per inch. One inch of aerogel provides thermal insulation equivalent to about 10 inches of fiberglass. Based on the values in the following Table, an effective porosity for a polymer coated aerogel for use as thermal insulation produces an R value per inch of 15 or more, preferably 20 or more, more preferably about 25 or more, most preferably about 30 to 40 per inch. The R value of polymer coated aerogels is very high, which makes them extremely efficient as thermal insulation:

| Insulation R-Value | |
|---|---|
| Material | R value (ft$^2$ ° F. h/Btu |
| Hardwood siding (1 in. thick) | 0.91 |
| Brick (4 in. thick) | 4.00 |
| Fiberglass batting (3.5 in. thick) | 10.90 |
| Fiberglass batting (6 in. thick) | 18.80 |
| Fiberglass board (1 in. thick) | 4.35 |
| Cellulose fiber (1 in. thick) | 3.70 |
| Flat glass (0.125 in. thick) | 0.89 |
| Insulating glass (0.25 in space) | 1.54 |
| Air space (3.5 in. thick) | 1.01 |
| Free stagnant air layer | 0.17 |
| Sheathing (0.5 in. thick) | 1.32 |

Depending on the particular use of the insulating material, the use of polymer coated aerogel can enable greater energy efficiency, volume efficiency, or even enable a product where none could be developed at all. For instance, appliances such as ovens and refrigerators can incorporate polymer coated aerogel insulation and dramatically reduce power requirements.

As the need for strength or flexibility increases, the process is controlled to provide for greater monomer loading. The polymer content of the polymer coated aerogel generally ranges from 10% to 95%, more preferably 20% to 90%.

Where the polymer coated aerogel is for use as an acoustic insulation material, an effective porosity is a porosity effective to produce the Sound Transmission Class (STC) rating required for a given application.

—Modification of the Surface of the Aerogel Substrate

Factors that influence adsorption of monomer onto the surface of the aerogel include, but are not necessarily limited to the surface tension of the monomer film, the surface energy of the aerogel, and the binding energy of the monomer. Monomer adsorption can be improved by treating the aerogel substrate to incorporate "compatibilizing groups," or groups which produce a treated aerogel substrate surface having a greater affinity for given monomers and/or groups which copolymerize with given monomers. Treating the aerogel substrate can be accomplished either during manufacture of the aerogel substrate or after manufacture of the aerogel substrate.

For exemplary methods for treating the aerogel substrate during manufacture, see the following references, each of which is incorporated herein by reference: *The use of vinyl functional aerogels for reinforcement of silicone rubbers*, J. K. Floess, R. Field, S. Rouanet, J. Non-Cryst. Sol., 285, 101-108 (2001); *Organic/Inorganic Hybrid Network Materials by the Sol-Gel Approach*, J. Wen and G. L. Wilkes, Chem. Mater., 8, 1996 p 1667-1681; *Hybrid Inorganic-Organic Materials by Sol-Gel Processing of Organofunctional Metal Alkoxides*, U. Schubert, N. Husing, and A. Lorenz, Chem. Mater. 1995, 7, 2010-2027; and, *The Sol-Gel Process*, L. L. Hench and J. K. West, Chem. Rev., 1990, 90, 33-72.

In a preferred embodiment, the aerogel surface is silylated to incorporate silylating agents comprising compatibilizing groups. In one embodiment, the surface of the aerogel substrate is pretreated with silylating agent effective to react with surface —OH groups and to form covalent Si—O—Si bonds comprising one or more compatibilizing groups which copolymerize with polymerizable groups in the monomer film.

Where the monomers comprise polymerizable unsaturated carbon-carbon bond(s), the compatibilizing groups preferably comprise one or more polymerizable unsaturated carbon-carbon bond(s). Examples of compatilibizing groups for use with monomers comprising unsaturated carbon-carbon bonds include, but are not necessarily limited to allylalkylchlorosilanes, vinylalkylchlorosilanes, and congeners thereof comprising unsaturated carbon-carbon bond(s) having up to about 20 carbon atoms. Preferred silylating agents comprising an unsaturated polymerizable carbon-carbon bond include, but are not necessarily limited to vinyldimethylchlorosilane, and allyl dimethyl chlorosilane.

Where the monomer comprises an amide bond, preferred compatibilizing groups comprise organic amino groups effective to produce organically modified silica effective to form amide bonds with the polymer coating. Examples of suitable silylating agents comprising organic amino groups include, but are not necessarily limited to 3-aminopropyl trimethoxysilane and aminophenyl trimethyoxysilane (APTMOS).

In one embodiment, the silylating agent comprises compatibilizing group(s) effective to render the surface of the aerogel substrate more organic, thereby improving adsorption of the monomer film. In this embodiment, suitable silylating agents include, but are not necessarily limited to organo-chlorosilanes and disiloxanes.

—Additives

It may be desirable to coat the aerogel substrate with one or more additives, either before or after polymerization of the monomers. Suitable additives include, but are not necessarily limited to additives effective to opacify the polymer coated aerogel, to decrease thermal conductivity, and/or to strengthen the polymer coated aerogel. Suitable additives comprise an element including, but not necessarily limited to carbon and metal (preferably metal oxide). In a preferred embodiment, the additives are selected from the group consisting of carbon and titanium dioxide.

Where the additive is deposited before the monomer film, the additive is deposited onto the surface of the aerogel substrate using any method effective to produce sufficient permeation into the bubble matrix. In one embodiment, the additive is deposited onto the aerogel substrate using chemical vapor deposition. Suitable additives for chemical vapor deposition, or other techniques, include, but are not necessarily limited to carbon and titanium dioxide.

In order to deposit the additive using chemical vapor deposition, an additive precursor is fed to the chamber. The additive precursor preferably is gaseous under chemical vapor deposition conditions (a "gaseous additive precursor"), and decomposes to produce a film of the desired additive. Suitable additive precursors for carbon include hydrocarbons, including but not necessarily limited to gaseous hydrocarbons, preferably methane. Suitable additive precursors for titanium dioxide include, but are not necessarily limited to titanium-containing gases, preferably titanium chloride. Titanium chloride hydrolyzes to form titanium dioxide in situ. After the additive is deposited onto the aerogel substrate, the monomer film is deposited onto the aerogel substrate and polymerized to produce the polymer coating.

This embodiment is useful when it is desirable to protect an additive during subsequent handling of the polymer coated aerogel. For example, where the additive is carbon, deposition of the additive prior to polymerization avoids the production of black dust in later handling and use.

Polymerization of Monomer Film

Either substantially simultaneous with deposition or after deposition of a substantially uniform monomer film, the monomer film is subjected to polymerization conditions effective to polymerize the monomers and to produce a substantially uniform polymer coating. The polymerization conditions vary with the monomer, but generally comprise a catalyst or initiator, a controlled temperature, a pressure of about 1 atm or more, and a time of about 24 hours or less. Preferably, the temperature is about 250° C. or less, more preferably about 200° C. or less.

The type of initiator will vary depending upon the type of monomer. Certain monomers are activated by gaseous initiating agents, including but not necessarily limited to acidic or alkaline gases. Examples of such gases include, but are not necessarily limited to borohalides, hydrogen chloride, trimethyl amine, and ammonia. A preferred borohalide is $BF_3$. Other monomers are activated by energetic initiating agents. Examples of energetic initiating agents include, but are not necessarily limited to light, heat, electromagnetic energy, and electrical energy. Suitable electrical energy includes, but is not necessarily limited to an electron beam. For some monomers, it may be necessary to deposit an initiator onto the aerogel substrate.

Once a substantially uniform polymer coating is formed on the aerogel substrate, remaining unreacted monomer preferably is pumped out of the chamber. The formation of monomer film and polymer coating may be simultaneous or stepwise, and may be repeated several times (if necessary) until an effective polymer coating is formed.

Post Polymerization Treatments

The polymer-coated aerogel also may be treated with post polymerization additives, which may be volatile or non-volatile. Suitable post polymerization additives include, but are not necessarily limited to waterproofing agents, IR opacifiers, metal-binding moieties, selective binding agents for chemical detection, stabilizers, and microbial growth inhibitors. Preferred post polymerization additives are waterproofing agents, stabilizers, carbon, and titanium dioxide.

The method will be better understood with reference to the following examples, which are illustrative only:

Example 1

A sample of silica aerogel 2×3×4 cm (0.5532 g) was placed into a lightly closed container with 0.864 g of commercially available "super-glue" in gel form (~90% ethylcyanoacrylate). The container was placed into an oven at 65-70° C. for 47 hours. Upon removal from the oven, much of the monomer had hardened on the bottom of the container, but some of monomer had equilibrated into the aerogel network and then polymerized. The treated sample weighed 0.7322 g, having gained 32% in weight. This equates to a 24.4% cyanoacrylate coating in the product.

The sample was subjected to compression testing on a MTS Qtest/25 machine with a 100 lb load cell at 1 mm/minute in the linear range of 20% to 40% compression. The modulus was determined to be 0.557 kg/cm$^2$ (0.0546 MPa). Infra-red analysis of the product confirmed the presence of poly(ethylcyanoacrylate) in the aerogel network.

Example 2

A sample of silica aerogel (0.6191 g) was similarly treated as in Example 1, using 1.33 g of super-glue in gel form. The container was placed into an oven at 48° C. for 74 hours. The treated sample weighed 0.8510 g, but still had a strong odor of ethylcyanoacrylate. A few drops of water were added to the container (not touching the aerogel) and the closed container sat overnight at ambient temperature to ensure completion of polymerization.

This sample was tested for compressive modulus using the same instrument and method as in Example 1, resulting in a value of 0.556 kg/cm$^2$ (0.0545 MPa.) Two control samples from the same batch of aerogel provided modulus values of 0.392 kg/cm$^2$ (0.0384 MPa) and 0.382 kg/cm$_2$ (0.0375 MPa.) Thus, the treated samples had a modulus roughly 44% higher than the untreated samples.

Example 3

A sample of silica aerogel was exposed to vapors of caprolactam by heating the sample in a lightly closed container with the monomer at 62° C. for 2.5 days. The treated sample gained 23.7% in mass, equating to 19.2% caprolactam in the sample. The modulus of this sample was 0.487 Kg/cm$^2$, representing an improvement of approximately 25% over the untreated controls.

An IR spectrum of the material confirmed the deposition of organics onto the aerogel, but the wavenumber of the carbonyl group was shifted slightly higher than in bulk caprolactam. This peak was at the same location (1640 cm$^{-1}$) as the carbonyl peak for nylon-6, but a second peak of nylon-6, which was located at 1540 cm$^{-1}$ was not evident in the spectrum. Peaks unique to caprolactam were not evident, suggesting that caprolactam was not present in large amounts. It is uncertain whether the monomer reacted with SiOH groups on the aerogel to form an ester linkage, or whether ring opening and polymerization occurred at temperatures well below that required in a bulk commercial process. A Raman spectrum of the material was identical to that of caprolactam. It is possible that the monomer remained unaltered, but interaction between the caprolactam carbonyl and SiOH groups shifted the IR absorbance peak slightly.

Example 4

A sample of silica aerogel was exposed to vapors of caprolactam by heating the sample in a lightly closed container with the monomer at 150° C. for 22 hours. The treated sample appeared smoky and increased in mass by 6.1%, equating to 5.8% caprolactam in the sample. The sample was then heated to 220° C. for 30 minutes to initiate polymerization of the monomer into nylon-6. The mass of the sample dropped by ~1.5% during heating due to volatilization of some of the caprolactam. The final product was smoky brown in color.

The modulus of this sample was 0.600 Kg/cm$^2$, representing a gain of approximately 55% over the untreated controls.

An IR spectrum of the material confirmed the presence of carbonyl-bearing material in the product. As in Example 3, the spectrum was complicated and did not cleanly match either the sample of pure nylon-6, or the monomer. The interactions between the silica aerogel and the organic material resulted in shifts of the energy at which various bonds absorb, thus, shifting the spectrum relative to pure compounds.

Example 5

Aerogel substrate is placed in a sealed chamber. Phenol is introduced into the chamber as a solid or a melt, kept separate from the aerogel except for vapor access. The temperature is raised to about 70° C. and maintained until a substantially uniform film of the phenol is deposited onto the aerogel substrate.

A catalytic amount of ammonia is added, followed by a slight stoichiometric excess (1:1 to 1:1.3 mole ratio) of formaldehyde added over about one hour in the form of a gas. (The formaldehyde also can be added as an aqueous solution, preferably a 50% aqueous solution, if kept physically separated from the aerogel except for vapor access). The temperature of the system is held at about 65 to 70° C. and at ambient pressure for an additional 2 to 4 hours. The temperature of the system is then raised to 130 to 200° C. for about 2 hours while water vapor is allowed to escape from the chamber. The chamber and coated aerogel are then allowed to cool to ambient temperature under a nitrogen purge.

Example 6

Trioxane is sublimed onto an aerogel substrate in a closed chamber by heating solid trioxane to about 40 to 60° C. while avoiding direct contact between the solid trioxane and the aerogel. Once a substantially uniform film of the trioxane is deposited onto the surface of the aerogel, a small amount (from 0 to 5% of the mass of the trioxane) of ethylene oxide is added to the chamber, followed by the introduction of a catalytic amount of boron trifluoride. The sealed reaction chamber is heated to 70 to 90° C. for 2 to 3 hours, allowing the pressure to increase autogenously. Following a purge of the chamber with nitrogen, acetic anhydride is added and the temperature is maintained at 70 to 90° C. for 1 hour with no purge. The chamber and coated aerogel are then allowed to cool to ambient temperature under a nitrogen purge.

Persons of ordinary skill in the art will recognize that many modifications may be made to the foregoing without departing from the spirit and scope thereof. The embodiment described herein is meant to be illustrative only and should not be taken as limiting the invention, which is defined in the following claims.

What is claimed is:

1. A polymer coated aerogel having a compressive modulus and comprising:
   an aerogel substrate comprised of a bubble matrix, wherein the aerogel substrate has a first compressive modulus;
   an additive deposited on the aerogel substrate, wherein the additive permeates into the bubble matrix, and wherein the additive consists of titanium dioxide; and
   a polymer coating deposited on the aerogel substrate, wherein the polymer coating permeates into the bubble matrix,
wherein the polymer coated aerogel maintains an effective porosity, wherein the term effective porosity comprises a porosity effective to retard heat transfer required for a predetermined application, wherein the compressive modulus of the polymer coated aerogel is greater than the first compressive modulus, wherein the polymer coated aerogel is produced in accordance with the following steps:

provided the aerogel substrate comprising the bubble matrix in a chamber;

depositing the additive on the aerogel substrate under deposition conditions effective to produce permeation of the additive into the bubble matrix of the aerogel substrate;

providing a monomer to the chamber, wherein the monomer is comprised of a vapor phase monomer by vaporizing the monomer at a vaporization temperature of about 200° C. or less at about 1 atm or less to produce the vapor phase monomer;

depositing the monomer on the aerogel substrate under deposition conditions effective to produce a vapor pressure sufficient to cause the vapor phase monomer to permeate into the bubble matrix and deposit on the aerogel substrate, producing a monomer film; and polymerizing the monomer film under polymerization conditions effective to produce the polymer coating, wherein the polymer coating is deposited substantially over the additive and wherein the step of depositing the additive occurs before the step of depositing the monomer.

2. The polymer coated aerogel of claim 1 wherein the polymer coating increases the weight of the aerogel substrate by about 20 wt. % or more.

3. The polymer coated aerogel of claim 1 wherein the compressive modulus of the polymer coated aerogel is about 20% or more greater than the first compressive modulus of the aerogel substrate.

4. The polymer coated aerogel of claim 1, wherein the step of depositing the monomer further comprises adsorbing the monomer onto the aerogel substrate, and wherein the polymerization conditions comprise:
an initiator;
a polymerization pressure of 1 atmosphere or more;
a polymerization time of about 24 hours or less; and
a polymerization temperature of about 250° C. or less.

5. The polymer coated aerogel of claim 1 wherein the polymer coated aerogel comprises a polymer content of from about 20% to about 90%.

6. The polymer coated aerogel of claim 1, wherein the polymer coating does not coat the entire surface of the aerogel substrate.

7. The polymer coated aerogel of claim 1, wherein the step of depositing the additive is comprised of a chemical vapor deposition process.

8. The polymer coated aerogel of claim 7, wherein the additive is comprised of an additive precursor, wherein the additive precursor is gaseous under chemical vapor deposition conditions and decomposes to produce an additive film.

* * * * *